United States Patent
Lee et al.

(10) Patent No.: US 11,954,339 B2
(45) Date of Patent: Apr. 9, 2024

(54) MEMORY ALLOCATION DEVICE AND METHOD THEREOF

(71) Applicants: HYUNDAI MOTOR COMPANY, Seoul (KR); KIA CORPORATION, Seoul (KR)

(72) Inventors: Pyoung Hwa Lee, Seoul (KR); Jin Woo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 467 days.

(21) Appl. No.: 17/327,120

(22) Filed: May 21, 2021

(65) Prior Publication Data

US 2022/0100400 A1    Mar. 31, 2022

(30) Foreign Application Priority Data

Sep. 28, 2020    (KR) .................. 10-2020-0126263

(51) Int. Cl.
| | | |
|---|---|---|
| G06F 12/16 | (2006.01) | |
| G01C 21/34 | (2006.01) | |
| G06F 3/06 | (2006.01) | |
| G06F 16/245 | (2019.01) | |
| G06F 16/2455 | (2019.01) | |
| G06F 16/29 | (2019.01) | |

(52) U.S. Cl.
CPC ....... *G06F 3/0631* (2013.01); *G01C 21/3446* (2013.01); *G06F 3/0604* (2013.01); *G06F 3/0673* (2013.01); *G06F 12/16* (2013.01); *G06F 16/24561* (2019.01); *G06F 16/24569* (2019.01); *G06F 16/29* (2019.01)

(58) Field of Classification Search
CPC .................................................. G06F 12/00–16
See application file for complete search history.

(56) References Cited

U.S. PATENT DOCUMENTS

| | | | | |
|---|---|---|---|---|
| 7,386,697 | B1 * | 6/2008 | Case ................... | G06F 12/1027 |
| | | | | 711/E12.043 |
| 9,792,736 | B1 * | 10/2017 | Koebler ................. | G07C 5/008 |
| 2010/0198494 | A1 * | 8/2010 | Chao ...................... | G01C 21/34 |
| | | | | 701/532 |
| 2017/0371561 | A1 * | 12/2017 | Cai .......................... | G06F 9/38 |
| 2020/0074583 | A1 * | 3/2020 | Holland ............... | G06F 12/1081 |
| 2023/0013998 | A1 * | 1/2023 | Mody .................... | G06N 20/00 |

\* cited by examiner

*Primary Examiner* — Robert W Beausoliel, Jr.
*Assistant Examiner* — Nirav K Khakhar
(74) *Attorney, Agent, or Firm* — Lempia Summerfield Katz LLC

(57) ABSTRACT

A memory allocation device includes a storage including at least one memory pool in which a memory piece used to search for a route is previously generated and a controller that determines whether it is possible to search for the route using the previously generated memory piece and determines an added amount of memory pieces to previously allocate a memory of the storage, when it is impossible to search for the route.

19 Claims, 4 Drawing Sheets

MEMORY ALLOCATION DEVICE AND METHOD THEREOF

CROSS-REFERENCE TO RELATED APPLICATION

This application claims the benefit of priority to Korean Patent Application No. 10-2020-0126263, filed in the Korean Intellectual Property Office on Sep. 28, 2020, the entire contents of which are incorporated herein by reference.

TECHNICAL FIELD

The present disclosure relates to a memory allocation device and a method thereof.

BACKGROUND

A route planning server may receive a departure point and a destination point input from a user to search for route data and may provide the route data from the departure point to the destination point. To provide the route data, the route planning server may execute a route planning algorithm while allocating a memory object in predetermined units at a time to need the memory.

In general, the route planning server allocates a memory object in predetermined units in a static manner when executing the route planning algorithm. As the memory is allocated in predetermined units, an unnecessary memory may be allocated to waste the memory. As a speed where data with the insufficient memory is processed is slow, a time taken to perform route planning becomes long. Thus, there is a need for a technology of allocating only a memory required upon route planning.

SUMMARY

The present disclosure has been made to solve the above-mentioned problems occurring in the prior art while advantages achieved by the prior art are maintained intact.

An aspect of the present disclosure provides a memory allocation device for dynamically allocating a memory upon route planning to reduce a time taken to perform the route planning and a method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a memory allocation device may include a storage including at least one memory pool in which a memory piece used to search for a route is previously generated. The device may further include a controller that determines whether it is possible to search for the route using the previously generated memory piece and determines an added amount of memory pieces to previously allocate a memory of the storage, when it is impossible to search for the route.

The controller may calculate a number where it is possible to produce memory pieces, using a value obtained by dividing all available memories by the number of memory pools.

The controller may compare the number where it is possible to produce the memory pieces with the number of memory pieces addable one time and may determine the added amount of memory pieces based on the compared result.

The controller may determine the number of the memory pieces addable one time as the added amount of memory pieces, when the number where it is possible to produce the memory pieces is greater than the number of the memory pieces addable one time.

The controller may determine the number where it is possible to produce the memory pieces as the added amount of memory pieces, when the number where it is possible to produce the memory pieces is less than the number of the memory pieces addable one time.

The controller may determine whether it is possible to execute a route planning algorithm using the memory pieces produced by the determined added amount of memory pieces.

The controller may execute the route planning algorithm using the memory pieces produced by the determined added amount of memory pieces to generate a final route, when it is possible to execute the route planning algorithm using the determined added amount of memory pieces.

The controller may release the previously generated memory piece, when generating the final route.

The controller may determine that route planning fails, when it is impossible to search for the route using the memory pieces produced by the determined added amount of memory pieces.

The memory piece may include a plurality of memory cells.

According to another aspect of the present disclosure, a memory allocation method may include previously producing a memory piece used to search for a route in at least one memory pool. The method may further include determining whether it is possible to search for the route using the previously produced memory piece. The method may further include determining an added amount of memory pieces to previously allocate a memory, when it is impossible to search for the route using the previously produced memory piece.

The memory allocation method may further include calculating a number where it is possible to produce memory pieces, using a value obtained by dividing all available memories by the number of memory pools.

The memory allocation method may further include comparing the number where it is possible to produce the memory pieces with the number of memory pieces addable one time and determining the added amount of memory pieces based on the compared result.

The determining of the added amount of memory pieces may include determining the number of the memory pieces addable one time as the added amount of memory pieces, when the number where it is possible to produce the memory pieces is greater than the number of the memory pieces addable one time.

The determining of the added amount of memory pieces may include determining the number where it is possible to produce the memory pieces as the added amount of memory pieces, when the number where it is possible to produce the memory pieces is less than the number of the memory pieces addable one time.

The memory allocation method may further include determining whether it is possible to execute a route planning algorithm using the memory pieces produced by the determined added amount of memory pieces.

The memory allocation method may further include executing the route planning algorithm using the memory pieces produced by the determined added amount of memory pieces to generate a final route, when it is possible to execute the route planning algorithm using the determined added amount of memory pieces.

The memory allocation method may further include releasing the previously produced memory piece, after generating the final route.

The memory allocation method may further include determining that route planning fails, when it is impossible to search for the route using the memory pieces produced by the determined added amount of memory pieces.

The memory piece may include a plurality of memory cells.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
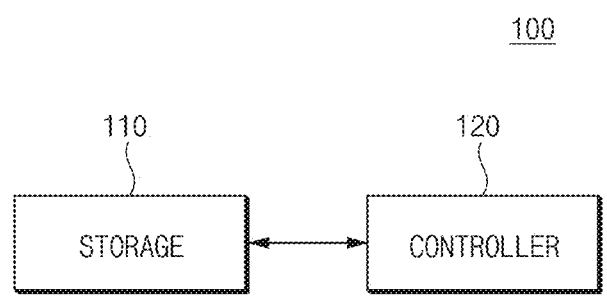
FIG. 1 is a block diagram illustrating a configuration of a memory allocation device according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, or the like.

FIG. 1 is a block diagram illustrating a configuration of a memory allocation device according to an embodiment of the present disclosure.

As shown in FIG. 1, a memory allocation device 100 according to an embodiment of the present disclosure may include a storage 110 and a controller 120. According to an embodiment of the present disclosure, the memory allocation device 100 may be included in a server capable of searching for a route requested from a user.

The storage 110 may store an algorithm of executing the overall operation of the memory allocation device 100 according to an embodiment of the present disclosure. According to an embodiment, the storage 110 may store an algorithm capable of searching for a route requested from the user (a route from a departure point to a destination point).

Furthermore, the storage 110 may include a memory pool where a memory piece used to search for at least one route is produced. The memory pool may include at least one memory piece, and the memory piece may include a plurality of memory cells. Herein, the memory cell may refer to a memory minimum unit having a fixed size and may be used to indicate information about a location and a speed of each section upon route planning.

The memory 110 may include at least one of a flash memory, a hard disk, a memory card, a read-only memory (ROM), a random access memory (RAM), an electrically erasable and programmable ROM (EEPROM), a programmable ROM (PROM), a magnetic memory, a magnetic disc, or an optical disc.

The controller 120 may be implemented by various processing devices, such as a microprocessor, embedding a semiconductor chip or the like capable of calculating or executing various commands. The controller 120 may control an operation of the memory allocation device 100 according to an embodiment of the present disclosure. In detail, the controller 120 may determine whether it is possible to search for a route using a produced memory piece. When it is impossible to search for the route, the controller 120 may determine an added amount of memory pieces and may previously allocate a memory of the storage 110. A detailed description of the controller 120 is given with reference to FIG. 2.

Figure 2:
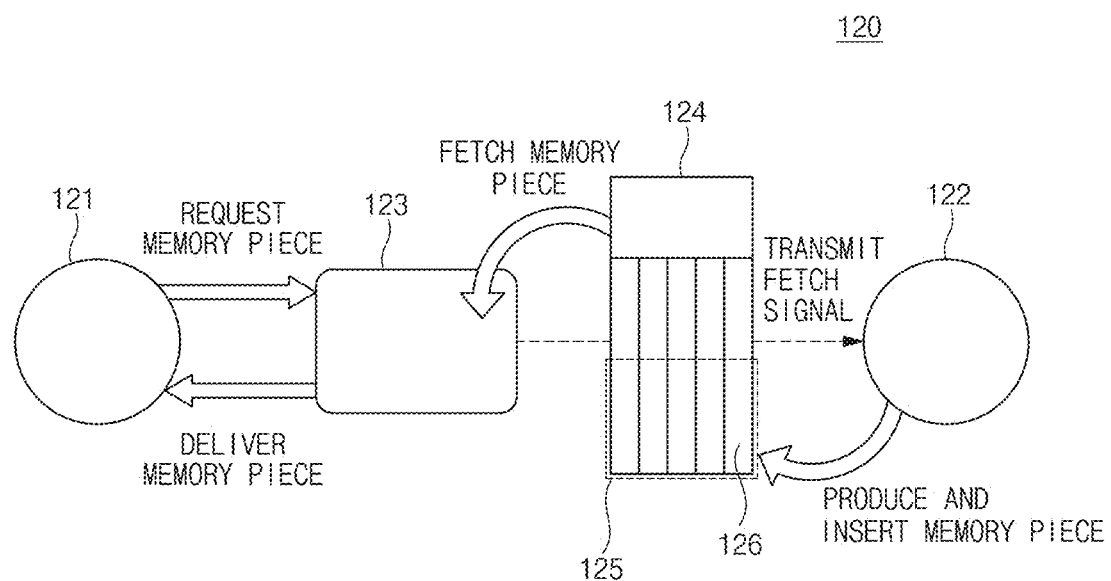
FIG. 2 is a drawing schematically illustrating an operation of a memory allocation device according to an embodiment of the present disclosure.

FIG. 2 is a drawing schematically illustrating an operation of a memory allocation device according to an embodiment of the present disclosure.

As shown in FIG. 2, a controller 120 may previously produce a memory piece 125 including a plurality of memory cells 126 included in a storage 110 of FIG. 1. The memory piece 125 may be previously produced in at least one memory pool 124 and may include the plurality of memory cells 126. When receiving a request for route planning from a user, the controller 120 may execute a route planning algorithm based on the memory piece 125 previously produced in the memory pool 124.

According to an embodiment, the controller 120 may include a consumer 121 for requesting the memory piece 125 to be used when executing the route planning algorithm. The controller 120 may further include a memory manager 123 for receiving a request for the memory piece 125 from the consumer 121, fetching the memory piece 125 from the memory pool 124, and delivering the memory piece 125 to the consumer 121. The controller 120 may further include a producer 122 for producing at least one memory piece in the memory pool 124. Hereinafter, to describe the operation of the controller 120 in detail, operations of the consumer 121, the producer 122, and the memory manager 123 are separately described.

The consumer 121 may request the memory manager 123 to use a memory piece to be used when executing the route planning algorithm. When receiving the request to use the memory piece from the consumer 121, the memory manager 123 may determine whether it is possible to execute the route planning algorithm using the memory piece 125 previously produced in the memory pool 124. When it is determined that it is possible to execute the route planning algorithm using the memory piece 125 previously produced in the memory pool 124, the memory manager 123 may fetch the memory piece 125 in the memory pool 124 and may deliver the memory piece 125 to the consumer 121. The consumer 121 may execute the route planning algorithm based on the memory piece 125 delivered from the memory manager 123. When the route planning algorithm is executed, the consumer 121 may generate a final route and may guide the user (a vehicle or a terminal) along the generated final route.

Meanwhile, when it is determined that it is impossible to execute the route planning algorithm using the memory piece 125 previously produced in the memory pool 124, the memory manager 123 may request the producer 122 to additionally produce a memory piece (transmit a memory piece fetch signal). The producer 122 may produce memory pieces such that the memory pieces 125 in the memory pool 124 are kept above the number of the consumers 121. When receiving the request to additionally produce the memory piece 125 from the memory manager 123, the producer 122 may determine an added amount of memory pieces and may allocate the memory by the added amount of memory pieces to produce the memory pieces.

To determine the added amount of memory pieces, the producer 122 may first calculate a number where it is possible to produce memory pieces. According to an embodiment, the producer 122 may calculate the number where it is possible to produce the memory pieces using a value obtained by dividing all available memories of the storage 110 by the number of the memory pools 124. The producer 122 may compare the number of memory piece capable of being produced using all available memories with the number of memory pieces addable one time (herein, the number of the memory pieces addable one time may vary with performance of the controller 120) and may determine the added amount of memory pieces based on the compared result.

According to an embodiment, when the number of the memory piece capable of being produced using all the available memories is greater than the number of the memory pieces addable one time, the producer 122 may determine the number of the memory pieces addable one time as the added amount of memory pieces. Furthermore, when the number of the memory piece capable of being produced using all the available memories is less than the number of the memory pieces addable one time, the producer 122 may determine the number of the memory pieces capable of being produced using all the available memories as the added amount of memory pieces. Thus, because an embodiment of the present disclosure determines the added amount of memory pieces in the above-mentioned manner and allocates the memory by the determined added amount of memory pieces, the efficiency of using the memory may be more improved than a manner which collectively allocates a certain size of memory.

When the producer 122 allocates the memory by the determined added amount of memory pieces to additionally produce memory pieces, the memory manager 123 may determine whether it is possible to execute the route planning algorithm using the added amount of memory pieces. When it is determined that it is possible to execute the route planning algorithm using the added amount of memory pieces and when the consumer 121 requests the memory pieces, the memory manager 123 may deliver the memory pieces to the consumer 121. The consumer 121 may receive the memory pieces to execute the route planning algorithm and may generate a final route to guide the user along the final route. According to an embodiment, the consumer 121 may search for a movable route from a departure point to a destination point using a plurality of memory cells included in the memory piece. The consumer 121 may select a memory cell including a route movable at the lowest cost among memory cells representing routes connected from the departure point and the destination point to generate the final route. The consumer 121 may release the produced memory pieces after the final route is guided to the user.

Figure 3:
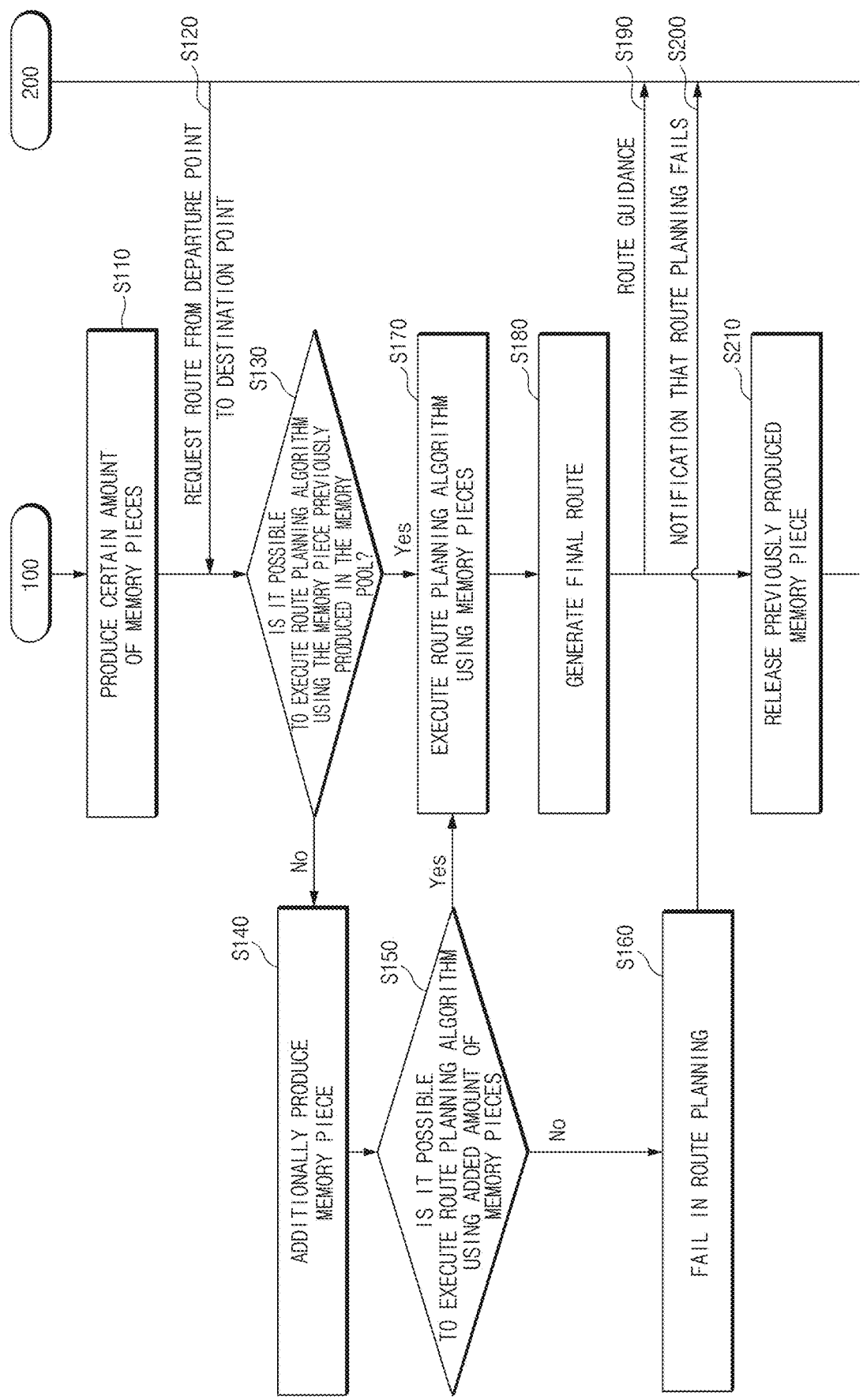
FIG. 3 is a flowchart illustrating a memory allocation method according to an embodiment of the present disclosure.

However, when it is determined that it is impossible to execute the route planning algorithm using the added amount of memory pieces (when other consumers previously use the memory pieces for search processing), and when the consumer 121 requests the memory pieces, the memory manager 123 may fail to deliver the memory pieces. Thus, the consumer 121 may fail to receive the memory pieces, may fail to execute the route planning algorithm, and may determine that the route planning fails. When the route planning fails, the consumer 121 may notify the user that the route planning fails. After notifying the user that the route planning fails, the consumer 121 may guide the user to search for a route again to ensure a time until it is possible to additionally produce a memory piece after search processing of other consumers is ended. FIG. 3 is a flowchart illustrating a memory allocation method according to an embodiment of the present disclosure.

As shown in FIG. 3, in S110, a controller 120 of a memory allocation device 100 of FIG. 1 may previously produce a memory piece including a plurality of memory cells included in a storage 110 of FIG. 1. In S120, the controller 120 may receive route request information from a departure point to a destination point, which are input to a user terminal 200 (or a vehicle).

When receiving a request for route planning from a user, the controller 120 may execute a route planning algorithm based on the memory piece previously produced in a memory pool 124 of FIG. 2.

In S130, the controller 120 may determine whether it is possible to execute the route planning algorithm using the memory piece previously produced in the memory pool 124. When it is determined that it is possible to execute the route planning algorithm using the memory piece in S130 (Yes), in S170, the controller 120 may execute the route planning algorithm using the memory piece. In S180, the controller 120 may generate a final route using memory cells included in the memory piece. When the final route is guided, in S190, the controller 120 may release the previously generated memory piece.

Meanwhile, when it is determined that it is impossible to execute the route planning algorithm using the memory piece previously produced in the memory pool 124 in S130 (No), in S140, the controller 120 may additionally produce memory pieces. According to an embodiment, in S140, the controller 120 may determine an added amount of memory pieces and may produce memory pieces using the determined added amount of memory pieces.

In S140, the controller 120 may calculate a number where it is possible to produce memory pieces. The controller 120 may calculate the number where it is possible to produce the memory pieces using a value obtained by dividing all available memories of the storage 110 by the number of the memory pools. The controller 120 may compare the number of memory pieces capable of being produced using all the available memories with the number of memory pieces addable one time and may determine the added amount of memory pieces based on the compared result.

When the number of the memory pieces capable of being produced using all the available memories is greater than the number of the memory pieces addable one time, the controller 120 may determine the number of the memory pieces addable one time as the added amount of memory pieces. When the number of the memory pieces capable of being produced using all the available memories is less than the number of the memory pieces addable one time, the controller 120 may determine the number of the memory pieces capable of being produced using all the available memories as the added amount of memory pieces. The controller 120 may allocate the memory by the determined added amount of memory pieces.

When allocating the memory by the determined added amount of memory pieces to additionally produce memory pieces, in S150, the controller 120 may determine whether it is possible to execute the route planning algorithm using the added amount of memory pieces. When it is determined that it is possible to execute the route planning algorithm using the added amount of memory pieces in S150 (Yes), the controller 120 may execute S170.

Meanwhile, when it is determined that it is impossible to execute the route planning algorithm using the added amount of memory pieces in S150 (No), in S160, the controller 120 may determine that the route planning fails. In S200, the controller 120 may notify the user that the route planning fails. Although not illustrated, after notifying the user that the route planning fails, the controller 120 may guide the user to search for a route again to ensure a time until it is possible to additionally produce a memory piece after search processing of other consumers is ended.

Figure 4:
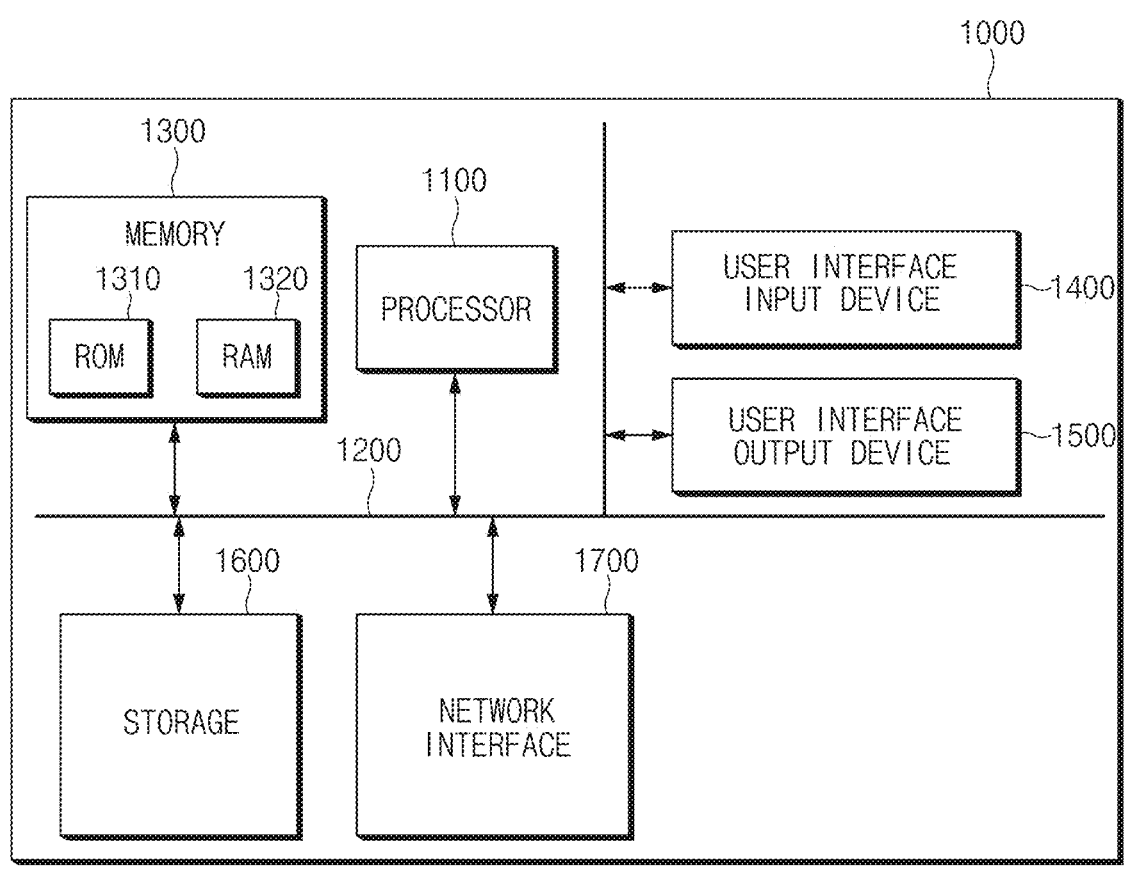
FIG. 4 is a block diagram illustrating a computing system for executing the method according to an embodiment of the present disclosure.

FIG. 4 is a block diagram illustrating a computing system for executing the method according to an embodiment of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM. The storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The memory allocation device and the method thereof according to an embodiment of the present disclosure may be provided to dynamically allocate the memory upon route planning, thus reducing a route planning time and efficiently using the entire system memory.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A memory allocation device, comprising:
a storage including at least one memory pool in which a memory piece used to search for a route is previously generated; and
a controller configured to determine whether it is possible to search for the route using the previously generated memory piece and determine an added amount of memory pieces to previously allocate a memory of the storage, when it is impossible to search for the route, wherein the memory piece includes a plurality of memory cells.

2. The memory allocation device of claim 1, wherein the controller calculates a number where it is possible to produce memory pieces, using a value obtained by dividing all available memories by the number of memory pools.

3. The memory allocation device of claim 2, wherein the controller compares the number where it is possible to produce the memory pieces with the number of memory pieces addable one time and determines the added amount of memory pieces based on the compared result.

4. The memory allocation device of claim 3, wherein the controller determines the number of the memory pieces addable one time as the added amount of memory pieces, when the number where it is possible to produce the memory pieces is greater than the number of the memory pieces addable one time.

5. The memory allocation device of claim 4, wherein the controller determines the number where it is possible to produce the memory pieces as the added amount of memory pieces, when the number where it is possible to produce the memory pieces is less than the number of the memory pieces addable one time.

6. The memory allocation device of claim 5, wherein the controller determines whether it is possible to execute a route planning algorithm using the memory pieces produced by the determined added amount of memory pieces.

7. The memory allocation device of claim 6, wherein the controller executes the route planning algorithm using the memory pieces produced by the determined added amount of memory pieces to generate a final route, when it is possible to execute the route planning algorithm using the determined added amount of memory pieces.

8. The memory allocation device of claim 7, wherein the controller releases the previously generated memory piece, when generating the final route.

9. The memory allocation device of claim 5, wherein the controller determines that route planning fails, when it is impossible to search for the route using the memory pieces produced by the determined added amount of memory pieces.

10. A memory allocation method, comprising:
   previously producing a memory piece used to search for a route in at least one memory pool;
   determining whether it is possible to search for the route using the previously produced memory piece; and
   determining an added amount of memory pieces to previously allocate a memory, when it is impossible to search for the route using the previously produced memory piece,
   wherein the memory piece includes a plurality of memory cells.

11. The memory allocation method of claim 10, further comprising:
   calculating a number where it is possible to produce memory pieces, using a value obtained by dividing all available memories by the number of memory pools.

12. The memory allocation method of claim 11, further comprising:
   comparing the number where it is possible to produce the memory pieces with the number of memory pieces addable one time and determining the added amount of memory pieces based on the compared result.

13. The memory allocation method of claim 12, wherein the determining of the added amount of memory pieces includes:
   determining the number of the memory pieces addable one time as the added amount of memory pieces, when the number where it is possible to produce the memory pieces is greater than the number of the memory pieces addable one time.

14. The memory allocation method of claim 13, wherein the determining of the added amount of memory pieces includes:
   determining the number where it is possible to produce the memory pieces as the added amount of memory pieces, when the number where it is possible to produce the memory pieces is less than the number of the memory pieces addable one time.

15. The memory allocation method of claim 14, further comprising:
   determining whether it is possible to execute a route planning algorithm using the memory pieces produced by the determined added amount of memory pieces.

16. The memory allocation method of claim 15, further comprising:
   executing the route planning algorithm using the memory pieces produced by the determined added amount of memory pieces to generate a final route, when it is possible to execute the route planning algorithm using the determined added amount of memory pieces.

17. The memory allocation method of claim 16, further comprising:
   releasing the previously produced memory piece, after generating the final route.

18. The memory allocation method of claim 14, further comprising:
   determining that route planning fails, when it is impossible to search for the route using the memory pieces produced by the determined added amount of memory pieces.

19. A memory allocation device, comprising:
   a storage including at least one memory pool in which a memory piece used to search for a route is previously generated; and
   a controller configured to determine whether it is possible to search for the route using the previously generated memory piece and determine an added amount of memory pieces to previously allocate a memory of the storage, when it is impossible to search for the route,
   wherein the controller calculates a number, where it is possible to produce memory pieces, using a value obtained by dividing all available memories by the number of memory pools.

* * * * *